(12) United States Patent
Chowdhry et al.

(10) Patent No.: US 8,723,891 B2
(45) Date of Patent: May 13, 2014

(54) SYSTEM AND METHOD FOR EFFICIENTLY PROCESSING DIGITAL VIDEO

(75) Inventors: Anita Chowdhry, Saratoga, CA (US); Subir Ghosh, San Jose, CA (US)

(73) Assignee: nComputing Inc., Santa Clara, CA (US)

( * ) Notice: Subject to any disclaimer, the term of this patent is extended or adjusted under 35 U.S.C. 154(b) by 575 days.

(21) Appl. No.: 12/861,217

(22) Filed: Aug. 23, 2010

(65) Prior Publication Data

US 2011/0080519 A1  Apr. 7, 2011

Related U.S. Application Data

(63) Continuation-in-part of application No. 12/395,195, filed on Feb. 27, 2009, now Pat. No. 8,110,880.

(60) Provisional application No. 61/248,266, filed on Oct. 2, 2009.

(51) Int. Cl.
*G09G 5/00* (2006.01)
*G09G 5/02* (2006.01)
*G06T 1/20* (2006.01)
*G09G 5/36* (2006.01)
*H04N 7/01* (2006.01)

(52) U.S. Cl.
USPC ........... 345/660; 345/604; 345/506; 345/558; 348/450

(58) Field of Classification Search
None
See application file for complete search history.

(56) References Cited

U.S. PATENT DOCUMENTS

| | | | |
|---|---|---|---|
| 5,859,651 A * | 1/1999 | Potu | 345/538 |
| 6,278,645 B1 | 8/2001 | Buckelew et al. | |
| 6,362,836 B1 | 3/2002 | Shaw et al. | |
| 6,563,517 B1 | 5/2003 | Bhagwat et al. | |
| 6,614,486 B2 * | 9/2003 | Hu | 348/453 |
| 6,674,479 B2 * | 1/2004 | Cook et al. | 348/453 |
| 6,753,865 B1 * | 6/2004 | Conklin | 345/475 |
| 7,126,993 B2 | 10/2006 | Kitamura et al. | |
| RE39,898 E * | 10/2007 | Nally et al. | 345/546 |

(Continued)

FOREIGN PATENT DOCUMENTS

| | | |
|---|---|---|
| TW | 200948087 A1 | 11/2009 |
| WO | WO-2009108345 A2 | 9/2009 |
| WO | WO-2009108345 A3 | 12/2009 |

OTHER PUBLICATIONS

"International Application Serial No. PCT/US2009/01239, International Search Report mailed Apr. 21, 2009", 4 pgs.

(Continued)

*Primary Examiner* — Maurice L McDowell, Jr.
*Assistant Examiner* — Donna J Ricks
(74) *Attorney, Agent, or Firm* — Schwegman, Lundberg & Woessner, P.A.

(57) ABSTRACT

In a digital video processing system for processing full-motion video in computer terminal systems, two main rendering paths are created for a computer terminal system: a screen buffer path and a full-motion video path. The screen buffer path renders a desktop display from a screen buffer within the terminal system. The full-motion video path decodes a video stream and then processes the decoded video stream with a video processing pipeline to fit the video frames within a destination video window within the desktop display. The video processing pipeline performs clipping, blending, chroma resampling, resizing, and color converting of the video frames in pipelined stages with minimal memory accesses. A video adapter then combines the desktop display with the processed digital video for a final terminal display.

35 Claims, 12 Drawing Sheets

(56) References Cited

U.S. PATENT DOCUMENTS

| | | | |
|---|---|---|---|
| 7,876,378 B1* | 1/2011 | Lew et al. | 348/420.1 |
| 2003/0030653 A1* | 2/2003 | Swan | 345/660 |
| 2004/0062309 A1 | 4/2004 | Romanowski et al. | |
| 2005/0021726 A1 | 1/2005 | Denoual | |
| 2005/0025238 A1* | 2/2005 | Uetani | 375/240.03 |
| 2006/0061582 A1* | 3/2006 | Kurupati et al. | 345/559 |
| 2006/0282855 A1 | 12/2006 | Margulis | |
| 2007/0097142 A1* | 5/2007 | Gies | 345/589 |
| 2009/0066716 A1* | 3/2009 | Meulen | 345/589 |
| 2009/0303156 A1 | 12/2009 | Ghosh et al. | |

OTHER PUBLICATIONS

"International Application Serial No. PCT/US2009/01239, Written Opinion mailed Apr. 21, 2009", 4 pgs.

"International Application Serial No. PCT/US2009/001239, International Preliminary Report on Patentability mailed Sep. 10, 2010", 7 pgs.

"U.S. Appl. No. 12/395,152 , Response filed Oct. 15, 2012 to Non Final Office Action mailed Jul. 19, 2012", 12 pgs.

"U.S. Appl. No. 12/395,152, Final Office Action mailed Jan. 4, 2013", 13 pgs.

"U.S. Appl. No. 12/395,152, Non Final Office Action mailed Jul. 19, 2012", 10 pgs.

"U.S. Appl. No. 12/395,152, Response filed Apr. 4, 2013 to Final Office Action mailed Jan. 4, 2013", 11 pgs.

"Chinese Application Serial No. 200980113099.3, Office Action mailed Sep. 26, 2012", with English translation of claims, 14 pgs.

"Chinese Application Serial No. 200980113099.3, Response filed Apr. 11, 2013 to Office Action mailed Sep. 26, 2012", with English translation of claims, 13 pgs.

"U.S. Appl. No. 12/395,152, Non Final Office Action mailed Aug. 29, 2013", 11 pgs.

"Chinese Application Serial No. 200980113099.3, Office Action mailed Jul. 31, 2013", 12 pgs.

* cited by examiner

SYSTEM AND METHOD FOR EFFICIENTLY PROCESSING DIGITAL VIDEO

CROSS REFERENCE TO RELATED APPLICATIONS

This application claims the benefit of U.S. patent application Ser. No. 12/395,152 filed Feb. 27, 2009, ("SYSTEM AND METHOD FOR LOW BANDWIDTH DISPLAY INFORMATION TRANSPORT"), and U.S. Provisional Patent Application Ser. No. 61/248,266 filed Oct. 2, 2009, ("SYSTEM AND METHOD FOR EFFICIENTLY PROCESSING DIGITAL VIDEO"), which applications are incorporated herein by reference in their entirety.

TECHNICAL FIELD

Embodiments of the invention relates to the field of video processing. In particular, but not by way of limitation, embodiments of the invention disclose techniques for efficiently processing digital video.

BACKGROUND

Centralized computer systems with multiple terminal systems for accessing the centralized computer systems were once the dominant computer architecture. These mainframe or mini-computer systems were shared by multiple computer users wherein each computer user had access to a terminal system coupled to the mainframe computer.

In the late 1970s and early 1980s, semiconductor microprocessors and memory devices allowed the creation of inexpensive personal computer systems. Inexpensive personal computer systems revolutionized the computing industry by allowing each individual computer user to have access to their own full computer system. Each personal computer user could run their own software applications and did not need to share any of the personal computer's resources (such as processing power, memory, and long-term storage space) with any other computer user.

Although personal computer systems have become the dominant form of computing, there has been a resurgence of the centralized computer with multiple terminals model of computing. Terminal systems can reduce maintenance costs and improve computer security since terminal users cannot easily introduce viruses into the main computer system or load in unauthorized computer programs. Furthermore, modern personal computer systems have become so powerful that the computing resources in these modern personal computer systems generally sit idle for the vast majority of the time.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings of the present disclosure can be used in other environments wherein digital video information is processed. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
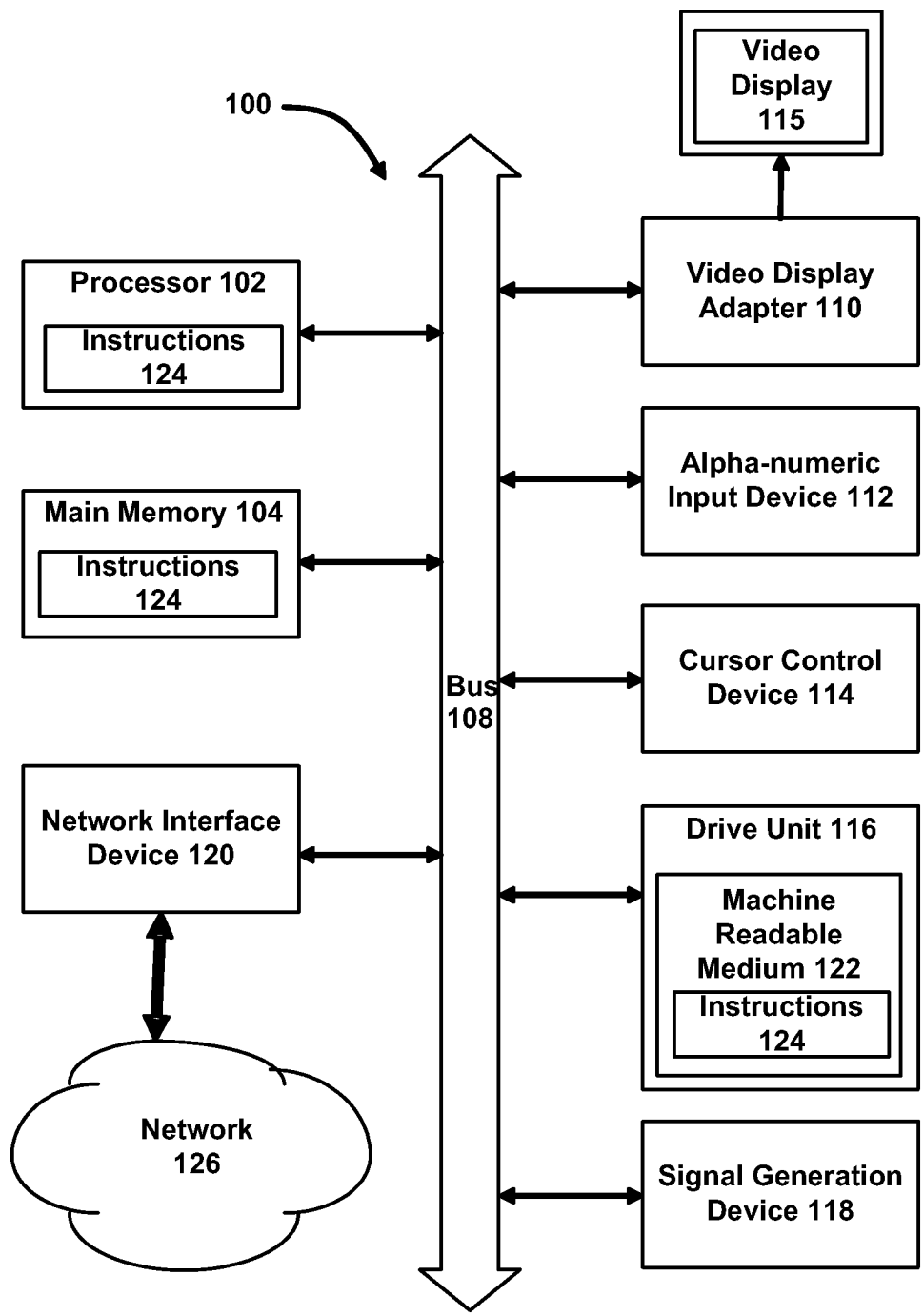
FIG. 1 illustrates a diagrammatic representation of a machine in the example form of a computer system within which a set of instructions for causing the machine to perform any one or more of the methodologies discussed herein may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse, trackball, touchscreen), a disk drive unit 116, a signal generation device 118 (e.g., a speaker) and a network interface device 120.

The disk drive unit 116 includes a machine-readable storage medium 122 on which is stored one or more sets of computer instructions and data structures (e.g., instructions 124, also known as "software") embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable storage media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable storage medium 122 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable storage medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to many "dumb" terminals. Such terminals are referred to as "dumb" terminals since the computing ability resided within the mainframe or mini-computer and the terminal merely displayed an output and accepted alpha-numeric input. No user application programs executed on a processor within the terminal system. Computer operators shared the mainframe computer with multiple individual users that each used terminals coupled to the mainframe computer. These terminal systems generally had very limited graphic capabilities and mostly visualized only alpha-numeric characters on the display screen of the terminal.

With the introduction of the modern personal computer system, the use of dumb terminals and mainframe computer became much less popular since personal computer systems provided a much more cost-effective solution. If the services of a dumb terminal were required to interface with a legacy terminal-based computer system, a personal computer could easily execute a terminal emulation application that would allow the personal computer system to emulate the operations of a dumb terminal at a cost very similar to the cost of a dedicated dumb terminal.

During the personal computer revolution, personal computers introduced high-resolution graphics to personal computer users. Such high-resolution graphics allowed for much more intuitive computer user interfaces than the traditional text-only display. For example, all modern personal computer operating systems provide user interfaces that use multiple different windows, icons, and pull-down menus that are implemented in high resolution graphics. Furthermore, high-resolution graphics allowed for applications that used photos, videos, and graphical images.

In recent years, a new generation of terminal systems have been introduced into the computer market as people have rediscovered some of the advantages of a terminal-based computer systems. For example, computer terminals allow for greater security and reduced maintenance costs since users of computer terminal systems cannot easily introduce computer viruses by downloading or installing new software. Only the main computer server system needs to be closely monitored in terminal-based computer systems. This new generation of computer terminal systems includes high-resolution graphics capabilities, audio output, and cursor control system (e.g., mouse, trackpad, trackball, touchscreen) input that personal computer users have become accustomed to. Thus, modern terminal systems are capable of providing the same features that personal computer system users have come to expect.

Modern terminal-based computer systems allow multiple users at individual high-resolution terminal systems to share a single personal computer system and all of the application software installed on that single personal computer system. In this manner, a modern high-resolution terminal system is capable of delivering nearly the full functionality of a personal computer system to each terminal system user without the cost and the maintenance requirements of an individual personal computer system for each user.

A category of these modern terminal systems is called "thin-client" systems since the terminal systems are designed to be very simple and limited (thus "thin") and depend upon server system for application processing activities (thus it is a "client" of that server system). The thin-client terminal system thus mainly focuses only on conveying input from the user to the centralized server system and displaying output from the centralized server system to the terminal user. Note that although the techniques set forth in this document will be disclosed with reference to thin-client terminal systems, the techniques described herein are applicable in other fields that process digital video. For example, any system that needs to efficiently process digital video information may use the teachings disclosed in this document.

An Example Thin-Client System

Figure 2A:
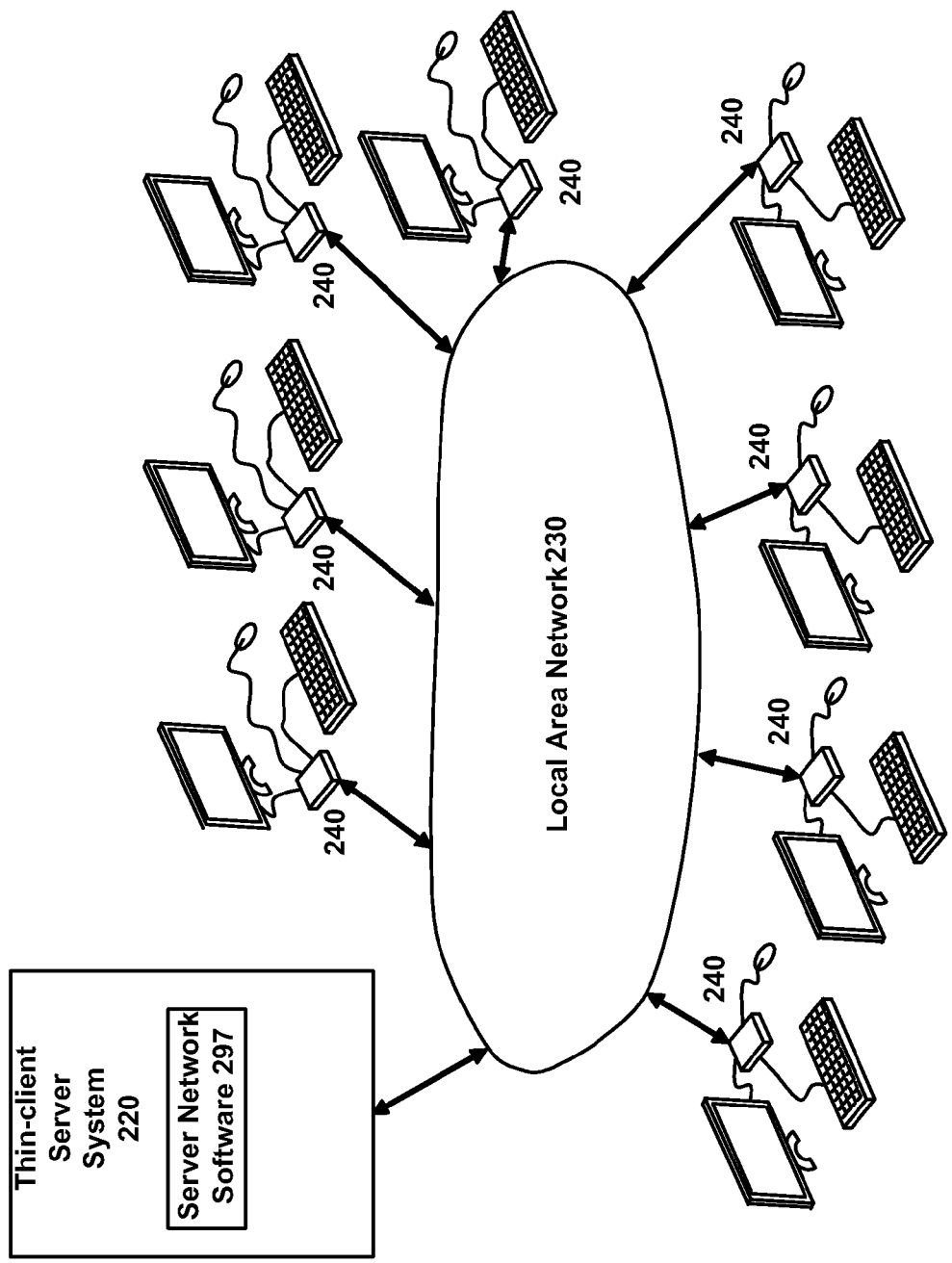
FIG. 2A illustrates a high-level block diagram of an example single thin-client server computer system supporting multiple individual thin-client terminal systems using a local area network.

FIG. 2A illustrates a conceptual diagram of a thin-client environment. Referring to FIG. 2A, a single thin-client server computer system 220 provides computer-processing resources to many thin-client terminal systems 240. In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server computer system 220 and the thin-client server computer system 220 transmits output information (such as video and audio) across the local area network 230 to the individual thin-client terminal systems 240.

Figure 2B:
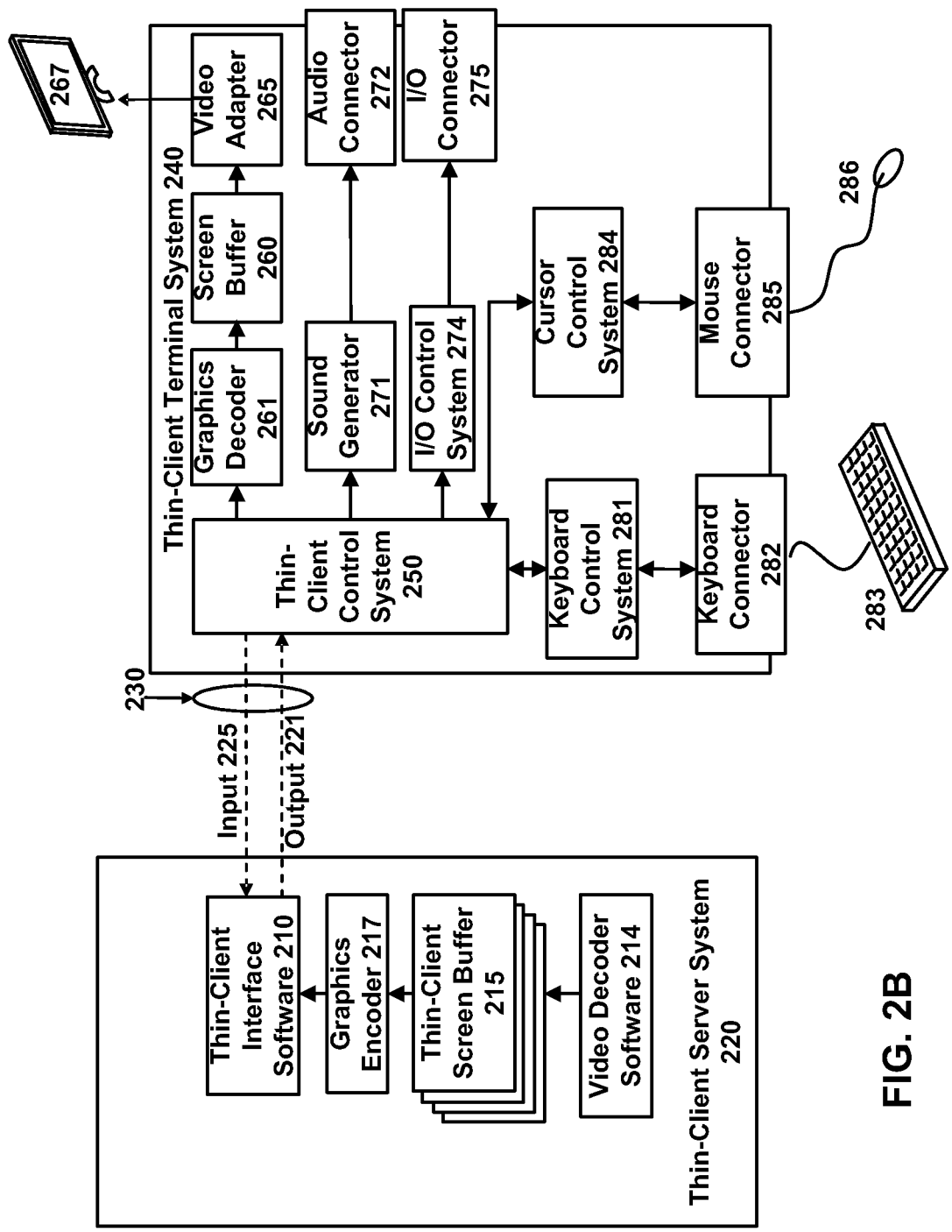
FIG. 2B illustrates a block diagram of an example thin-client terminal system coupled to a thin-client server computer system.

FIG. 2B illustrates a block diagram of one embodiment of a thin-client server computer system 220 coupled to one (of possibly many) thin-client terminal system 240. The thin-client server computer system 220 and thin-client terminal system 240 are coupled with a bi-directional digital communications channel 230 that may be a serial data connection, an Ethernet connection, or any other suitable bi-directional digital communication means such as the local area network 230 of FIG. 2A.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead. Keeping the cost low can be achieved since the thin-client terminal system 240 will not need the full computing resources or software of a personal computer system since those features will be provided by the thin-client server computer system 220 that will interact with the thin-client terminal system 240.

Referring back to FIG. 2B, the thin-client terminal system 240 provides both visual and auditory output using a high-resolution video display system and an audio output system. The high-resolution video display system consists of a graphics update decoder 261, a screen buffer 260, and a video adapter 265. When changes are made to a representation of a terminal's display in thin-client screen buffer 215 within the thin-client server computer system 220, a graphics encoder 217 identifies those changes to the thin-client screen buffer 215, encodes the changes, and then transmits the changes to the thin-client terminal system 240. Within the thin-client terminal system 240, the graphics update decoder 261 decodes graphical changes made to the associated thin-client screen buffer 215 in the thin-client server computer system 220 and applies those same changes to the local screen buffer 260, thus making screen buffer 260 an identical copy of the bit-mapped display information in thin-client screen buffer 215. Video adapter 265 reads the video display information out of screen buffer 260 and generates a video display signal to drive display system 267.

The audio sound system of thin-client terminal system 240 operates in a similar manner. The audio system consists of a sound generator 271 for creating a sound signal coupled to an audio connector 272. The sound generator 271 is supplied with audio information from thin-client control system 250 using audio information sent as output 221 by the thin-client server computer system 220 across bi-directional communications channel 230.

From an input perspective, thin-client terminal system 240 allows a terminal system user to enter both alpha-numeric (e.g., keyboard) input and cursor control device (e.g., mouse) input that will be transmitted to the thin-client server computer system 220. The alpha-numeric input is provided by a keyboard 283 coupled to a keyboard connector 282 that supplies signals to a keyboard control system 281. Thin-client control system 250 encodes keyboard input from the keyboard control system 281 and sends that keyboard input as input 225 to the thin-client server computer system 220. Similarly, the thin-client control system 250 encodes cursor control device input from cursor control system 284 and sends that cursor control input as input 225 to the thin-client server computer system 220. The cursor control input is received through a mouse connector 285 from a computer mouse 286 or any other suitable cursor control device such as a trackball or trackpad, among other things. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2B includes input/output control system 274 coupled to input/output connector 275. Input/output control system 274 may be a Universal Serial Bus (USB) controller and input/output connector 275 may be a USB connector in order to provide USB capabilities to the user of thin-client terminal system 240.

Thin-client server computer system 220 is equipped with multi-tasking software for interacting with multiple thin-client terminal systems 240. As illustrated in FIG. 2B, thin-client interface software 210 in thin-client server computer system 220 supports the thin-client terminal system 240 as well as any other thin-client terminal systems coupled to thin-client server computer system 220. The thin-client server system 220 keeps track of the state of each thin-client terminal system 240 by maintaining a thin-client screen buffer 215 in the thin-client server computer system 220 for each thin-client terminal system 240. The thin-client screen buffer 215 in the thin-client server computer system 220 contains representation of what is displayed on the associated thin-client terminal system 240.

Transporting Video Information to Terminal Systems

The bandwidth required to continually transmit an entire high-resolution video frame buffer can be quite large. In an environment wherein a shared computer network is used to transport the video display information such as thin-client environment of FIG. 2B, the large amount of display information transmitted to each thin-client terminal system 240 can adversely impact the computer network 230. If the display information is not encoded efficiently enough or the network bandwidth is not large enough, the large amount of display information may overwhelm the network thus not allowing the system to function at all.

When the applications running on the thin-client server computer system 220 are typical office software applications (e.g., word processors, databases, spreadsheets) then there are some simple techniques that can be used to significantly decrease the amount of display information that is delivered over the computer network 230 while maintaining a quality user experience for each terminal system user. For example, the thin-client server computer system 220 may only send display information across the computer network 230 to a thin-client terminal system 240 when the display information in the thin-client screen buffer 215 for that specific thin-client terminal system 240 actually changes. In this manner, when the display for a thin-client terminal system is static (no changes are being made to the thin-client screen buffer 215 in the thin-client server computer system 220), then no display information needs to be transmitted from the thin-client server computer system 220 to that thin-client terminal system 240. Small changes (such as a few words being added to a document in a word processor) will only require small updates to be sent.

As long as the software applications run by the users of thin-client terminal systems 240 do not change the display screen information very frequently, then the thin-client system illustrated in FIGS. 2A and 2B will work adequately. However, if some thin-client terminal system users run software applications that rapidly change the thin-client terminal's display screen (such as viewing full-motion video), the volume of network traffic over the computer network 230 will increase greatly due to the much larger amounts of graphical update messages that are transmitted. If several thin-client terminal system 240 users run applications that display full-motion video, then the bandwidth requirements for the communication channel 230 can become quite formidable such that data packets may be dropped. Dropped packets will greatly decrease the user experience. Thus, displaying full-motion video in the embodiment of FIG. 2B can be a very taxing application for a thin-client environment.

Referring to FIG. 2B, it can be shown that displaying full-motion video in the thin-client environment of FIG. 2B is handled very inefficiently. To display full motion video, video decoder software 214 on the thin-client server computer system 220 will access a video file or video stream and then render video frames into a thin-client screen buffer 215 associated with the thin-client terminal system 240 that requested the video. The graphics encoder 217 will then identify changes made to the thin-client screen buffer 215, encode those changes, and then transmit those changes through thin-client interface software 210 to the thin-client terminal system 240. This video processing technique is undesirable due to the high demand placed on network bandwidth to transmit the encoded changes. The undesirability of this technique may be compounded by the occurrence of video frame drops caused by the high demand on network bandwidth.

Figure 3:
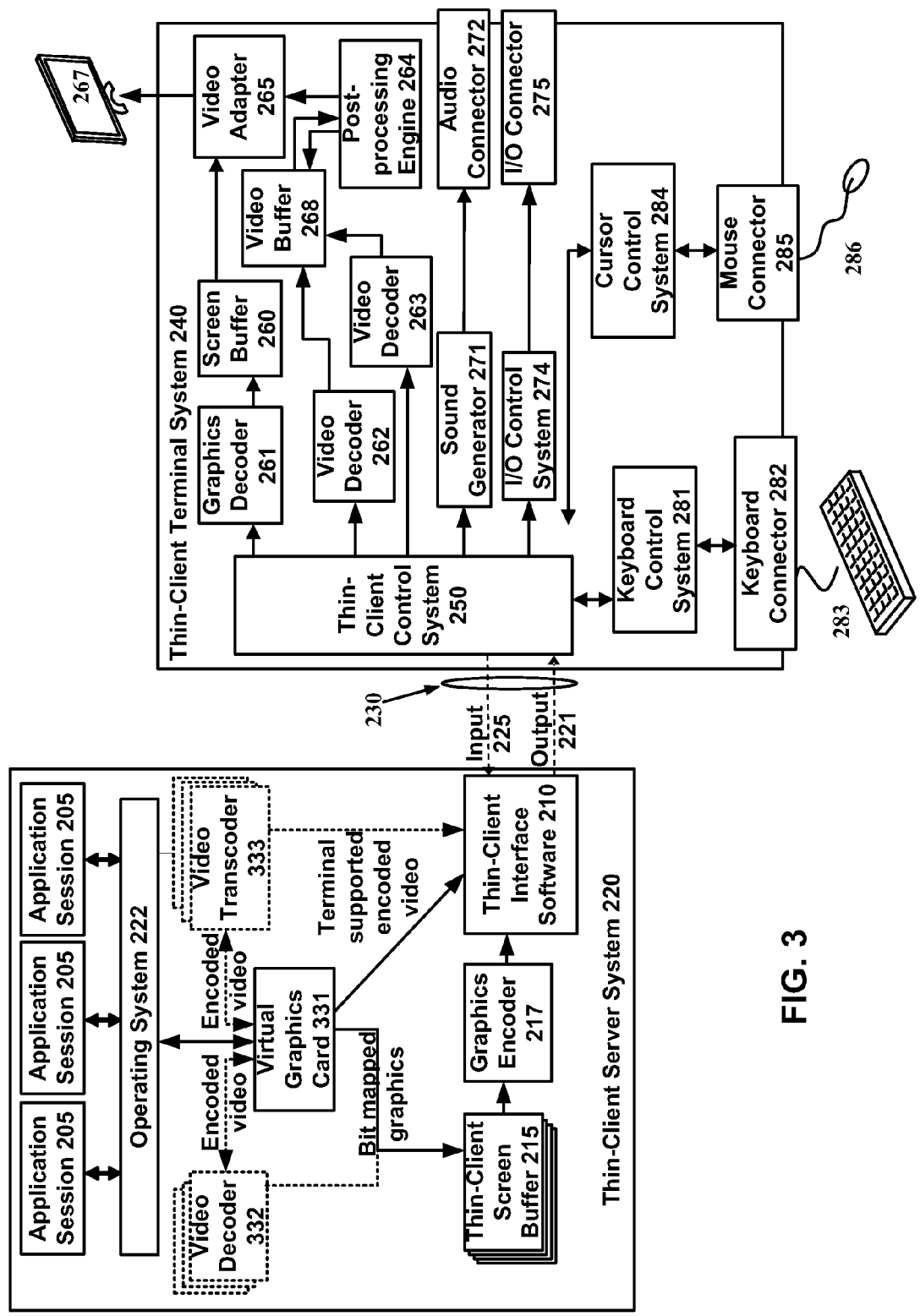
FIG. 3 illustrates an example thin-client server computer system and thin-client terminal system that support lower quality video stream decoding locally within the thin-client terminal system.

To create a more efficient system for handling full-motion video in a thin-client environment, a related patent application titled "System And Method For Low Bandwidth Display Information Transport" (Ser. No. 12/395,152, filed Feb. 27, 2009, and hereby incorporated by reference in its entirety) proposed a system wherein full-motion video information to be displayed on a thin client is transmitted directly to the thin-client system. In this manner, the inefficient steps of decoding full-motion digital video, placing the video frames in a thin-client screen buffer 215, and then re-encoding that video information are eliminated. An example of this more efficient system is illustrated in the example embodiments of FIG. 3 and FIG. 4. FIG. 3 illustrates a thin-client environment similar to that of FIG. 2B except that (when possible) the video transmission system has been modified to transmit full motion video streams directly to the thin-client terminal system 240 instead of decoding such video streams on the thin-client server computer system 220.

Referring to FIG. 3, a thin-client server computer system 220 and a thin-client terminal system 240 are displayed. The thin-client terminal system 240 of FIG. 3 is the same as the thin-client terminal system 240 of FIG. 2B except that two video decoders 262 and 263, a video buffer 268, and a post-processing engine 264 have been added. Other embodiments may have only a single video decoder or a plurality of video decoders. The video decoders 262 and 263 may receive a digital video stream from thin-client control system 250, decode the video stream, and render the decoded video frames in the video buffer 268. Note that by disabling the video decoders 262 and 263, the thin-client terminal system 240 of FIG. 3 can operate in a backwards-compatible mode such that it appears the same as the thin-client terminal system 240 of FIG. 2B.

The video decoders 262 and 263 and post-processing engine 264 may be implemented with software run on a processor, as discrete off-the-shelf hardware parts, or as licensed digital video decoder cores that are implemented with an Application Specific Integrated Circuit (ASIC) or a Field Programmable Gate Array (FPGA). In one embodiment, a licensed digital video decoder implemented as a part of an Application Specific Integrated Circuit was selected since other portions of the thin-client terminal system could also be implemented within the same ASIC.

The video transmission system in the thin-client server computer system 220 of FIG. 3 also is modified in order to transmit encoded digital video streams directly to the thin-client terminal system 240. Referring to the thin-client server computer system 220 of FIG. 3, the video system for supporting the improved thin-client terminal systems may include a virtual graphics card 331, thin-client screen buffers 215, and graphics encoder 217. Note that FIG. 3 illustrates other elements that may be included such as video decoders 332 and video transcoders 333. For more information on those elements, the reader should refer to the related U.S. patent application titled "System And Method For Low Bandwidth Display Information Transport" having Ser. No. 12/395,152, filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 supported by the thin-client server computer system 220. The goal of the virtual graphics card 331 is to output either bit-mapped graphics to be placed into the appropriate thin-client screen buffer 215 for a thin-client terminal system 240 or to output an encoded video stream that is supported by a video decoder (262 or 263) within a thin-client terminal system 240.

The video decoders 332 and video transcoders 333 within the thin-client server computer system 220 may be used to support the virtual graphics card 331 in handling digital video streams. Specifically, the video decoders 332 and video transcoders 333 help the virtual graphics card 331 handle encoded digital video streams that are not natively supported by the digital video decoder(s) (262 and 263) in thin-client terminal system 240. The decoders 332 are used to decode video streams and place the video data in thin-client screen buffer 215 (in the same manner as the system of FIG. 2B). The transcoders 333 are used to convert from a first digital video encoding format into a second digital video encoding format that is natively supported by a video decoder (262 or 263) in the target thin-client terminal system 240.

The transcoders 333 may be implemented as a digital video decoder for decoding a first digital video stream into individual decoded video frames, a frame buffer memory space for storing decoded video frames, and a digital encoder for re-encoding the decoded video frames into a second digital video format supported by the target thin-client terminal system 240. This enables the transcoders 333 to use existing video decoders on the personal computer system. Furthermore, the transcoders 333 could share the same video decoding software used to implement video decoders 332. Sharing code would reduce licensing fees.

The final output of the video system in the thin-client server computer system 220 of FIG. 3 is either graphics update messages from the graphics encoder 217 or an encoded digital video stream that is supported by the target thin-client terminal system 240. The thin-client interface software 210 outputs the graphics update messages and video stream information across communication channel 230 to the target thin-client terminal system 240.

In the thin-client terminal system 240, the thin-client control system 250 will distribute the incoming display information to the appropriate subsystem. Thus, graphical update messages will be passed to the graphics decoder 261 and the streaming video information will be passed to the appropriate video decoder (262 or 263). The graphics decoder 261 will decode the graphics update and then apply the graphics update to the thin-client terminal's screen buffer 260 appropriately. The video decoder (262 and/or 263) will decode incoming digital video streams and write the video frames into the thin-client terminal's video buffer 268. The video adapter 265 then reads the graphics information out of the screen buffer 260, while the post-processing engine 264 reads the video data from the video buffer 268. A final display output is generated as multiplexed data output from a multiplexer having frame buffer data and post-processed video data as the inputs. The final display output is transmitted to the display system 267.

The task performed by the video decoder (262 or 263) and post-processing engine 264 is not trivial. Specifically, the video decoder (262 or 263) will receive a digital video stream of a particular resolution, color scheme, and frame rate and then process and deliver that video stream to the video buffer 268. The post-processing engine 264 reads the decoded video data from the video buffer 268 and performs additional processing of the decoded video data, such as resizing the decoded video to the appropriate size, before the post-processed data is output to a multiplexer for use in generating a final display output. In one embodiment, the post-processing engine 264 may clip off portions of the video stream that are off-screen or blocked by an overlapping window. The post-processing engine 264 may calculate the source window co-ordinates of the video stream that would generate the resized video. These co-ordinates may be translated to yield addresses from which data may be retrieved from the video source for processing. All of these video processing tasks can easily be handled by a modern personal computer system. However, a design goal for the creation of the thin-client terminal system 240 is to make the thin-client terminal system 240 as simple and as low cost as possible since the objective is to replace a personal computer system with an inexpensive thin-client terminal system 240. If the implementation of the video decoder (262 and/or 263) and post-processing engine 264 is too complex, then the cost of the thin-client terminal system 240 may begin to approach the cost of a full personal computer system. Thus, more efficient methods of implementing the functions of the video decoders (262 and 263) and post-processing engine 264 are needed.

Example Video Post Processing Pipeline

In a traditional video processing system, two resources that are often heavily consumed are memory bandwidth and processing power. Memory bandwidth is heavily consumed since portions of a video image are read from memory, processed, and then written back to memory. Processing power is heavily consumed since virtually every pixel in a video display is processed through several different processing steps. The processing steps may include clipping, blending, color resampling due to resizing, and color conversion. At each step, pixel data may be read from memory, processed, and then written back to memory. Thus, the processing and memory-intensive nature of digital video processing makes the task that needs to be handled by the post-processing engine 264 in the system of FIG. 3 very difficult to implement at a low cost.

To implement a low-cost digital video processing system, the present disclosure introduces an efficient digital video processing pipeline. Instead of relying upon the standard software model of processing digital video wherein sections of video information are repeatedly read from memory, processed, and then written back to memory, the proposed digital video processing pipeline reads digital video information from memory and then passes the digital video information through a progressive series of processing steps. Between the various processing steps, First-In First-Out (FIFO) memory buffers are used to store temporary results. At the end of the video processing pipeline, a set of digital bits emerge that represent the desired video frame information after it has been decoded, scaled to a proper size, and converted to the proper color scheme (along with any other needed processing steps). These digital video bits can be merged into an existing video system to create a composite video output.

Figure 4:
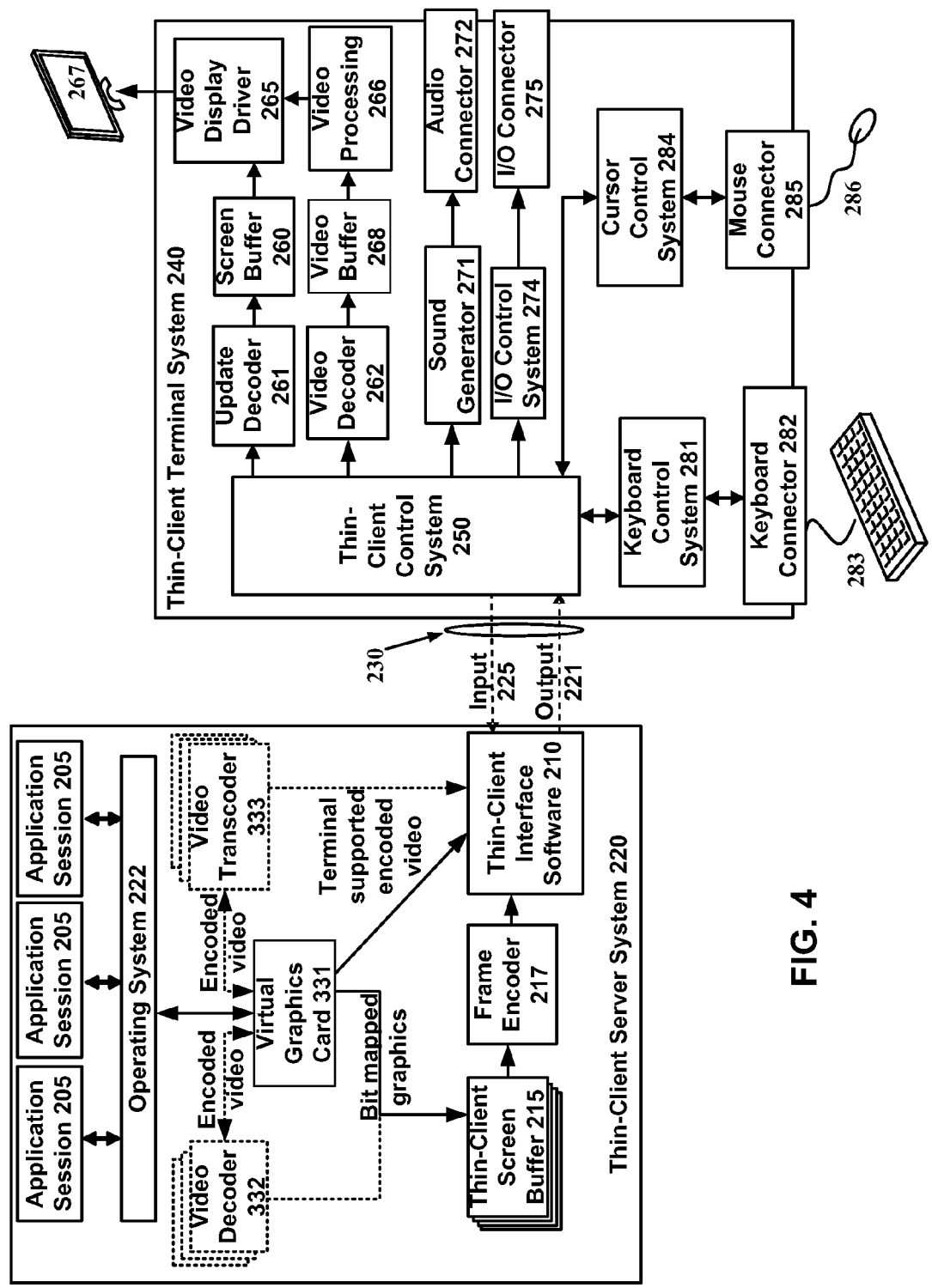
FIG. 4 illustrates an example thin-client server computer system and thin-client terminal system that support higher quality video stream decoding locally within the thin-client terminal system.

FIG. 4 illustrates a block diagram of the thin-client terminal system 240 of FIG. 3 wherein the newly proposed video processing pipeline system 266 is used to process encoded digital video information in a highly efficient manner that can be implemented at a relatively low cost.

Referring to the embodiment of FIG. 4, when the thin-client terminal system 240 receives an encoded digital video stream, the thin-client control system 250 in thin-client terminal system 240 directs the encoded digital video stream to video decoder 262. The digital video decoder 262 decodes the encoded digital video stream to render a series of video frames into a video buffer 268. (Note that the video buffer 268 may be part of a unified main memory system shared by various parts of the thin-client terminal system 240.) However, the video frames that the video decoder 262 renders into the video buffer 268 are not ready for immediate display since the video needs to be reformatted for the window that contains the video. For example, the video frames need to be resized to fit into the video window created by the user, need to have frame rate adjustments in order to switch from a native frame-rate to a refresh rate of the local display 267, and need to have a color conversion. In certain embodiments, a video frame may be clipped to account for a video window being partially moved out of the display area of the thin client terminal system 240. To handle these tasks (and possibly other additional tasks), a video processing pipeline system 266 reads the video frames stored in the video buffer 268 and outputs a series of display bits ready for display to a video adapter 265. The video adapter 265 combines these display bits with information from the screen buffer 260 to create a final display signal to drive output display system 267.

A significant number of video processing tasks are performed by the video processing pipeline system 266 in order to prepare a raw video stream for integration into a window within an existing desktop display. In one implementation that will be disclosed, the video processing pipeline system 266 performs the various tasks: frame rate conversion, frame blending, frame clipping, chroma upsampling, frame resizing, and color space conversion. Various different implementations may perform fewer or additional steps in the video processing. Each of these steps will be described individually.

Example Frame Rate Conversion—Videos are created in various different frame rates in terms of frames per second. Film has traditionally used 24 frames per second. American NTSC television uses two interlaced fields that are updated at 60 fields per second for a total of 30 frames per second. Thus, to display video encoded in a certain frame rate per second on a display system that refreshes at a different frame rate per second, a frame rate conversion needs to occur.

Figure 5:
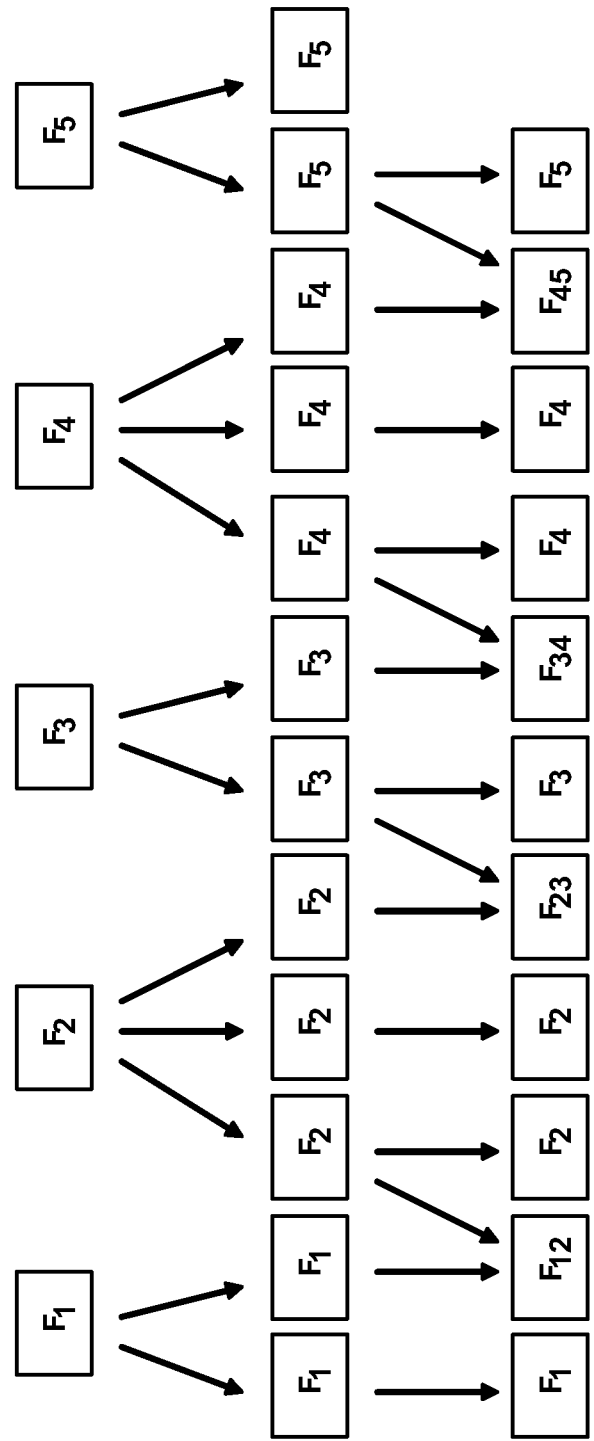
FIG. 5 illustrates twenty-four frames per second source video converted to sixty frames per second video and then to sixty frames per second blended video.

The most well-known frame-rate conversion is the 3-2 pull-down conversion used to convert 24 frames per second film to 60 fields per second video. This conversion is conceptually illustrated in FIG. 5. At the top of FIG. 5, a first row of frames from a 24 frames per second video is illustrated. To convert these 24 frames per second to 60 fields per second video, a repeating pattern of 2 source frames followed by 3 source frames is used. Thus, the second row of FIG. 5 illustrates a series of frames with the repeating 3 frames, 2 frames, 3 frames pattern (hence the name 3-2 pull-down conversion). This system has been used for decades in order to convert 24 frames per second film to 60 fields per second video for display on television. The same techniques can be used for converting digital videos of various frame rates to display systems with different refresh rates. For example, 24 frames per second video can be converted for display on a 60 frames per second display system using the same 3-2 pull-down system illustrated in FIG. 5.

Frame Blending—Although the standard 3-2 pull-down works well for converting film to analog video, the ability to digitally process video frames allows digital systems to improve upon the image quality by interpolating intermediate frames. Thus, instead of simply repeating the same frames as performed with the standard 3-2 pull-down system, a digital system can combine information from two adjacent video frames to create a new intermediate video frame. Such a synthesized intermediate video frame improves the video quality to a human viewer.

Referring again to FIG. 5, the second row of video frames represents the 60 frames per second 3-2 pull-down pattern. To improve the quality of these video frames, two different adjacent video frames are combined to create an interpolated intermediate video frame instead of simply repeating the same video frame. Thus, the third row shows video frame 1, then a combination of video frame 1 and video frame 2, video frame 2, video frame 2 again, then a combination of video frame 2 and video frame 3, and so on.

Frame Clipping—In modern personal computer systems, users may execute multiple applications within different windows on a display system. The various application windows may overlap each other and/or extend off the edge of a display system. For example, in FIG. 6A, an application window 620 extends off the edge of a display screen 610. Thus, the system cannot display the portion 621 of application window 620 that extends off the edge of a display screen 610. The portion 621 of application window 620 extending off the edge of display screen 610 should be clipped so that the system does not expend unnecessary resources rendering a portion of the window incapable of being displayed. This is referred to as "clipping" the unseen portion of the application window. In one non-limiting embodiment, frame clipping occurs prior to post-processing the video data by reading from memory only those portions of the decoded video stream that will be displayed. In one example embodiment, the system of the present disclosure performs clipping at the head of the video processing pipeline.

Figure 6A:
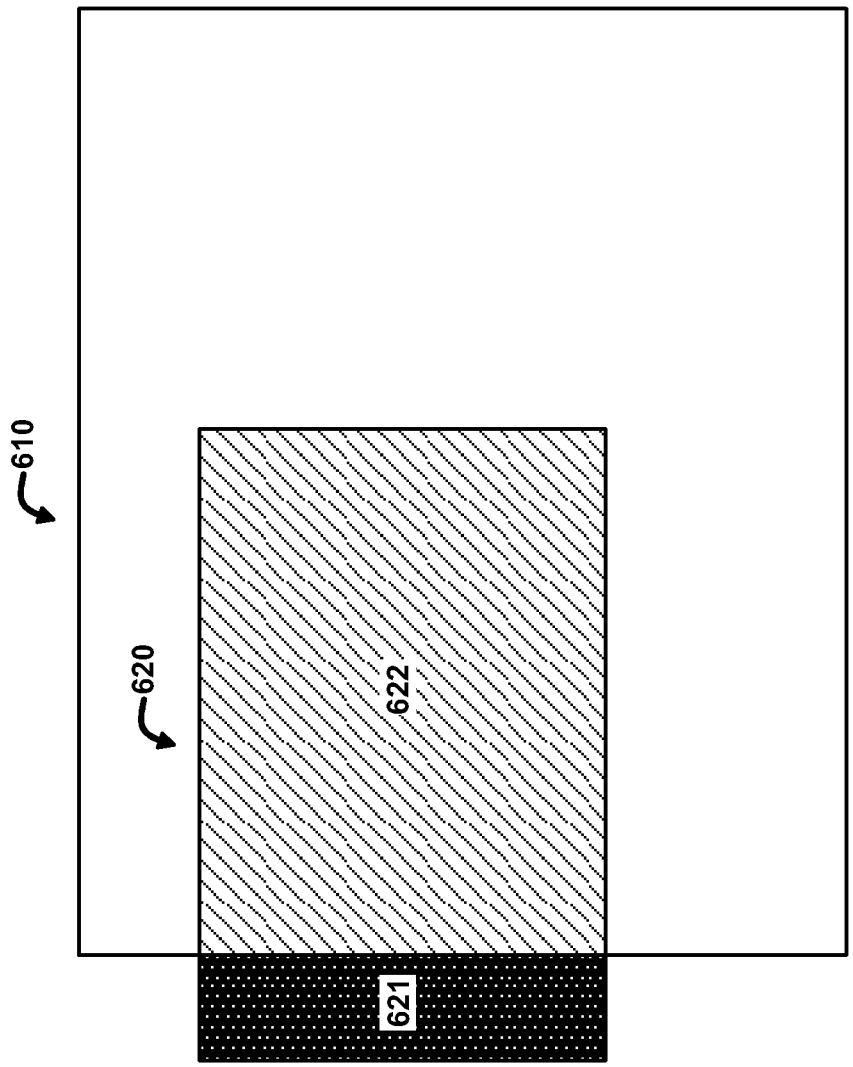
FIG. 6A conceptually illustrates a video window on a desktop display with a left portion clipped off.
Figure 6B:
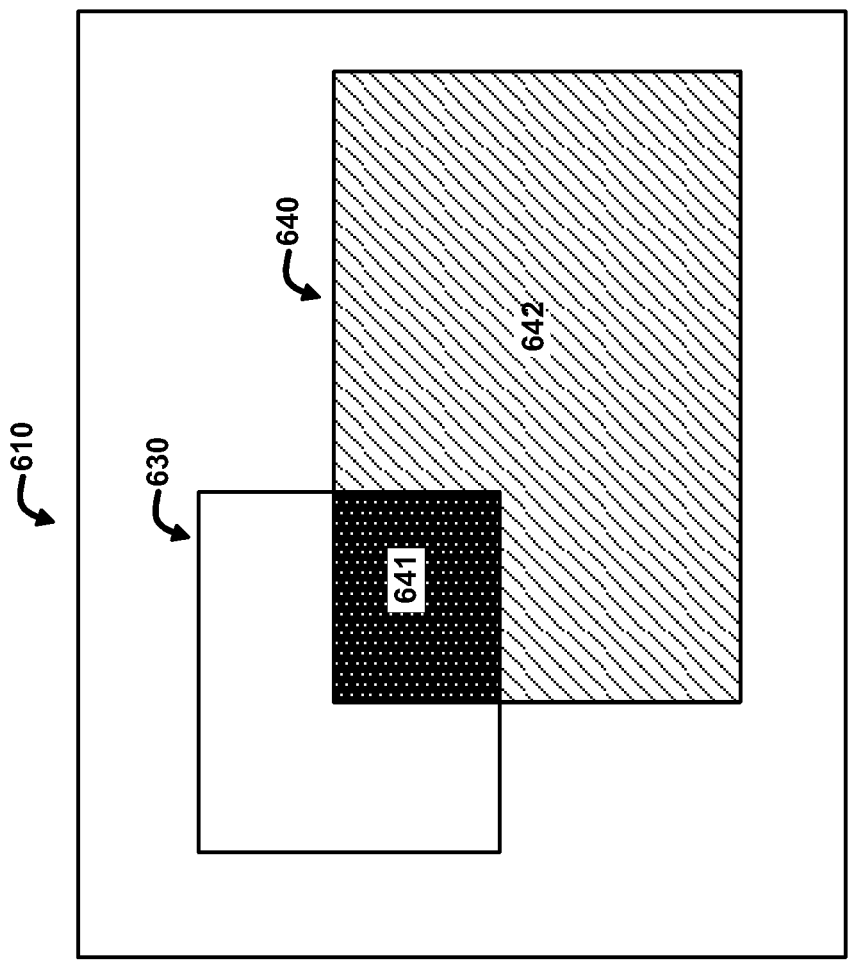
FIG. 6B conceptually illustrates a video window on a desktop display having an upper-left corner blocked by an overlapping window.

A related concept is the handling of window "overlays". For example, FIG. 6B illustrates a first application window 630 overlapping a second application window 640. In an embodiment in which the first application window 630 is in the foreground and hence is viewed as being "on top" of the second application window 640, the area 641 associated with the second application window 640 should not be rendered onto the display screen 610. The issue of displaying only the portions of a window that are not overlapped by other windows is known as "graphics overlays". Graphics overlays are handled by having the area in the screen buffer 260 that will be replaced by full motion video contain a specially encoded hue or chroma key color. For example, if window 640 were to display a video and that window 640 was partially obscured by window 630, then the area 642 (window 640 but without area 641) would be encoded with the special key color. Then, at the end of the video processing pipeline, only the areas with the specially encoded key color would be replaced with the data from the full-motion video. In one example embodiment, graphics overlays are handled after post-processing of the video stream is complete.

Chroma Upsampling—Digital video information is highly compressed in order to reduce transmission bandwidth and conserve space in storage systems. Since humans are more sensitive to differences in brightness than differences in color, the color information tends to be compressed more than the brightness information. Thus, the resolution of the brightness information tends to be higher than the resolution of the color information. Chroma upsampling uses interpolation to make the resolution of the brightness and color information equal.

Frame Resizing—Digital videos are encoded in some original ("native") horizontal and vertical resolution. However, a user may change the size of a video window and expect the video to fill the display of the resized (larger or smaller) window. Thus, the video will need to be resized from native resolution of original digital video into the size of the window that will display the video.

Color Conversion—There are multiple different methods of encoding pixel colors in digital video systems. Each different method of encoding color is known as a 'color space model'. Two popular color space models are the YCbCr model and the RGB (red, green, blue) model.

Traditional personal computer (PC) display systems are generally driven by red, green, and blue (RGB) voltage signals such that receiving RGB encoded pixel data would simplify the task of generating red, green, and blue voltage signals performed by the video display driver 265. However, television-based digital video encoding systems often use a different color space encoding method (such as the YUV color space) since RGB color space encoding is not efficient as a representation for color storage and transmission due to mutual redundancy in the RGB color space encoding systems. Thus, the video processing system 266 may need to translate the video information from a color space encoding system used in the digital video to the red, green, and blue (RGB) color space used by most personal computer display systems.

To accomplish all of the preceding video processing tasks, a traditional system might read video frame data from memory, perform one video processing task, and then write the video frame back to memory. Thus, in such an embodiment, the video image would need to access (read or write) a digital video frame many times before eventually displaying the video. Such repeated accesses to a digital video frame in memory every one-sixtieth of a second (for a 60 frames per second display) would end up requiring a very fast and very expensive video memory system. Such an expensive video memory system could defeat the entire objective of constructing a low-cost thin-client terminal system. Thus, the present disclosure uses a pipelined video processing system as illustrated in FIG. 7.

Figure 7:
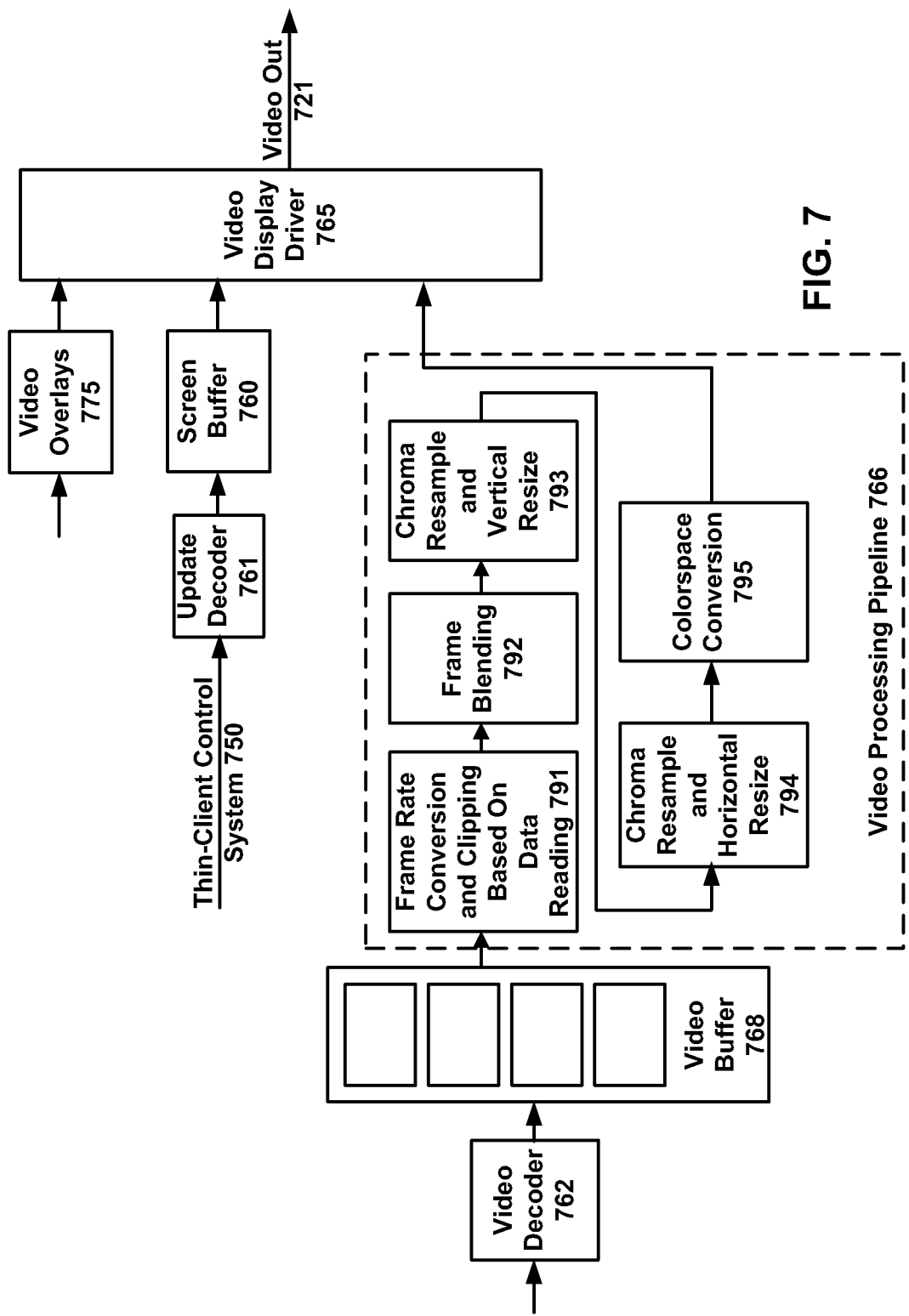
FIG. 7 illustrates a high-level block diagram of the example video processing pipeline from FIG. 4.

FIG. 7 illustrates a more detailed view of the video processing and display portion of the thin-client terminal system 240 depicted in FIG. 4. There are two main data paths for display information: the screen buffer path and the digital video path. These two different display information processing paths rejoin at the video display driver 765 that takes the display information from the various video information paths and generates a video output signal 721 for driving a display monitor.

The first path is the system for creating a duplicate of the screen buffer 215 representation in the thin-client server system 220 within the thin-client terminal system 240. In this path, the thin-client control system 750 passes screen buffer graphical updates to update decoder 761. Update decoder 761 decodes the graphical updates and updates the local thin-client terminal screen buffer 760. However, the screen buffer 760 will contain invalid information at locations where full-motion digital video information is being displayed. In these locations, a special reservation code or a chroma key color may be written indicating that the location should be replaced with display information from a digital video. The image in the screen buffer 760 is read out by video display driver 765 to generate a video output signal 721.

The second path is the system for handling full-motion encoded digital video streams properly. Compressed full-motion digital video streams are transmitted from the thin-client server computer system 220 to the thin-client terminal system 240 in a digital video encoding scheme created specifically for encoding full-motion video information. In this manner, digital video streams will be displayed with high quality. In the digital video path, the thin-client control system 750 passes digital video stream information to a video decoder 762. (Ideally, video decoder 762 will be an inexpensive 'off-the-shelf' integrated circuit or standard ASIC circuit library component so that the video decoder 762 is inexpensive.) The video decoder 762 decodes the incoming encoded digital video stream and renders frames of digital video into a video buffer 768. Due to efficient digital video encoding systems, the information from one frame is generally used to construct other video frames such that the video buffer 768 will almost always contain more than one video frame. Digital video frames that have been displayed and are no longer referenced for creating other video frames may be discarded.

Once digital video frames have been decoded and written into the video buffer 768 by the video decoder 762, the video processing pipeline 766 may perform a series of processing tasks to transform the raw video frames in the video buffer 768 into RGB pixel data that can be multiplexed with other display data by the video display driver 765 to generate a video output signal 721. In the embodiment illustrated in FIG. 7, five main processing stages are illustrated. The first processing stage 791 is responsible for reading the proper frame information into the video processing pipeline 766 at the proper rate in order to produce a new frame for each display screen refresh. Thus, the first stage handles the frame rate conversion. In addition, the first stage only reads in the video information that will be visible on screen. Thus, by only reading in decoded video information that will be visible on screen, the post-processing engine 264 performs frame clipping of decoded video frames prior to processing the video frames. Frame clipping is performed by calculating the pre-resized values of dropped columns and/or rows, thereby leaving only the portions of the pre-resized video source window that will be displayed on the screen after re-sizing. These coordinates may be translated to yield addresses from which video data may be retrieved from memory for processing. In effect, video data corresponding to the portions of the video window that will not be displayed on screen are not read from memory, and hence, are clipped.

At a second stage 792, frame blending occurs such that the video quality is improved by creating interpolated frames as needed. The third stage 793 combines chroma resampling and vertical resizing to create the proper number of lines to fit the video window. Similarly, the fourth stage 794 combines chroma resampling and horizontal resizing to create the proper number of columns to fit the video window. Finally, a final stage 795 performs color space conversion as needed in order to create final RGB data signals.

The RGB data output by the video processing pipeline 766 is provided to the video display driver 765. The video display driver 765 combines video information from the video processing pipeline 766 along with other display information to generate the final video output signal 721. The video display driver 765 will generally scan in display information from the screen buffer 760 and transform that display information to generate a video output signal. However, when the video display driver 765 crosses an area of the display screen that is occupied by a video window, the video display driver 765 will select the display information provided by the video processing pipeline 766.

In some embodiments, the video display driver 765 also may select additional video overlay 775 information instead of the screen buffer 760 or the video processing pipeline 766. For example, closed-caption information associated with a video stream may be overlayed on top of a video. Similarly, a cursor or pointer associated with a window-style operating system may be displayed using video overlay 775 information. The combined output from the screen buffer 760, the video processing pipeline 766, and any additional video overlay 775 information is used to create the final video output signal 721.

Example Video Post Processing Pipeline Details

Figure 8:
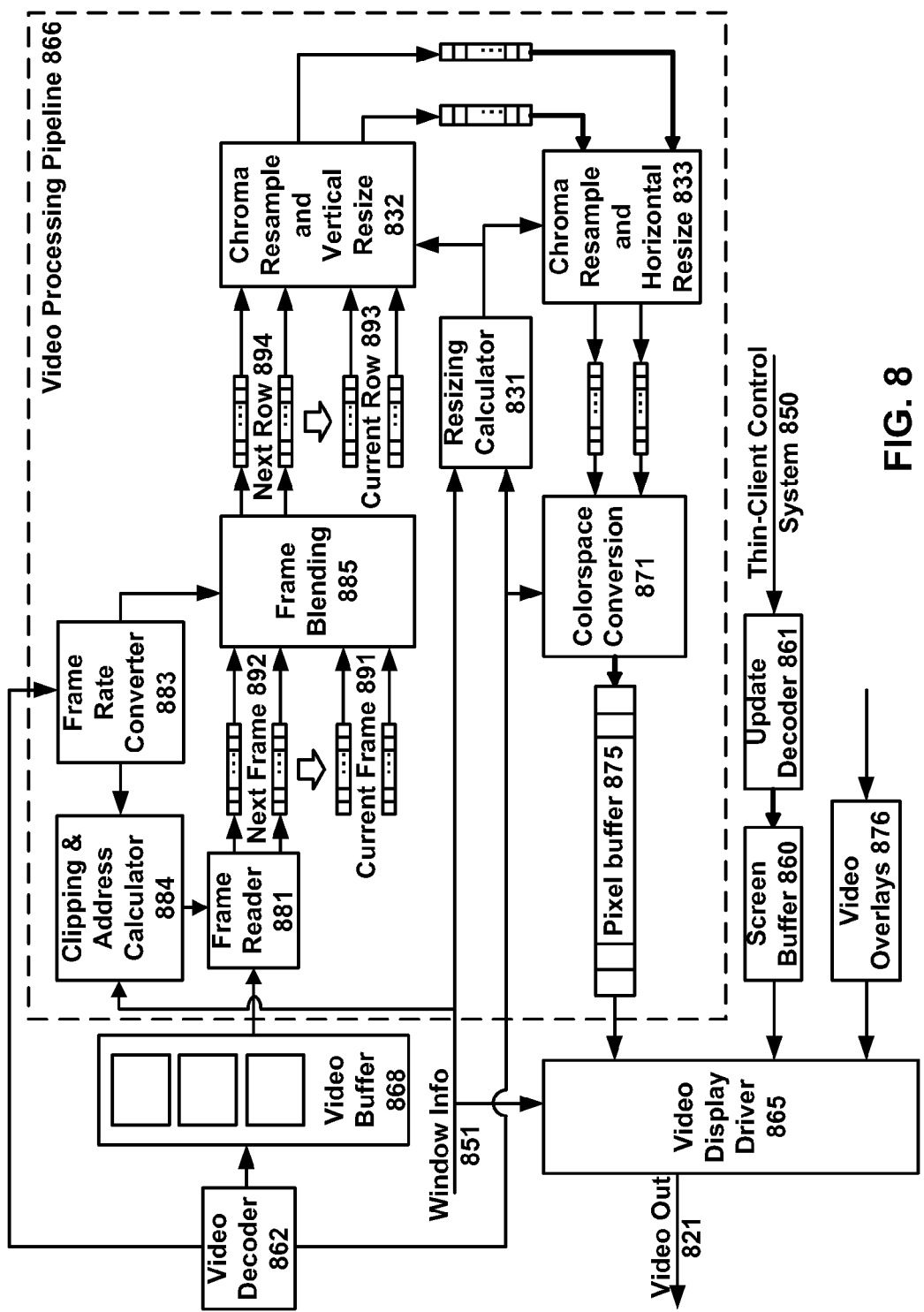
FIG. 8 illustrates a more detailed block diagram of the video processing pipeline from FIG. 7.

To fully describe how the video processing pipeline 766 of FIG. 7 operates, a full example is provided with reference to the detailed diagram of video processing pipeline 866 in FIG. 8. At the upper-left portion of FIG. 8, the video decoder 862 decodes incoming full-motion video frames into video buffer 868. Note that video buffer 868 will generally contain more than one video frame since compressed video frames use inter-frame redundancy to efficiently encode video frames.

The video processing pipeline 866 starts by having the video processing pipeline 866 obtain information about the digital video that needs to be rendered. The frame rate converter 883 may obtain source video frame rate information from the video decoder 862. A frame resizing calculator 831 may obtain video frame size information and color space information from the video decoder 862. A color space conversion stage 871 may also obtain video frame color space information from the video decoder 862. Note that these are only examples of where the information may be obtained; the information may be obtained from other sources.

The video processing pipeline 866 also may need information about the actual video window (window information 851), such as its shape and size, in which the digital video will be rendered. Thus, for example, the resizing calculator 831 obtains the window size information such that it can properly resize the source video to the proper output size for the video window. Similarly, the clipping and address calculator 884 may need to know the location of the shape and location of the window. For example, the clipping and address calculator 884 may need to know if the video window is partially off the display screen 610 as illustrated in FIG. 6A or if the video window is partially obstructed as illustrated in FIG. 6B. In the event the video window is clipped or re-sized, firmware or other suitably appropriate software may determine the size of the clipped or resized video window and calculate the source window co-ordinates that would generate the video window after resizing. The co-ordinates may be translated into addresses corresponding to decoded video source data to be retrieved from memory. In the embodiment in which frame clipping is performed as part of the video post-processing procedure, the firmware or other software is part of the thin-client terminal system 240. With the needed information about the source video and the destination video window, the video processing pipeline 866 may begin processing the source video in order to generate output data for display in the destination video window.

The frame rate converter 883 first compares the frame rate of the source video and the refresh rate of the display monitor to determine the proper frame rate conversion. For example, the frame rate converter 883 may convert from twenty-four frames per second source video to a sixty frames per second display refresh as illustrated in FIG. 5. Thus, the frame rate converter 883 determines which video frames will be read into the video processing pipeline (using frame rate conversions such as the 3-2 pull-down illustrated in FIG. 5) and the rate at which the frames are to be read.

Next, using the information from the frame rate converter 883 and the video window information 851, the clipping and address calculator 884 determines exactly which information from a video frame selected by the frame rate converter 883 needs to be read into the video processing pipeline 866. Specifically, the selection of which video frame is to be read from frame rate converter 883 establishes a base frame address. Then the clipping and address calculator 884 determines any address adjustments to be made based upon any clipping of the video frame. For example, referring to the application window 620 illustrated in FIG. 6A, the base address of the application window 620 would start at the upper-left of application window 620. However, since area 621 of application window 620 is not within the visible display area, the clipping and address calculator 884 adds an adjustment to the base address in order to begin reading in data from the upper-left corner of the visible portion 622 of application window 620.

Note that by having this video frame clipping performed prior to the beginning of the video processing pipeline 866, the amount of video information that needs to be processed is immediately reduced. Thus, there will not be any "bubbles" in the pipeline of unneeded data such that no unnecessary processing of information will occur for display information that will ultimately be discarded since it will not be displayed.

Using the information from the clipping and address calculator 884, frame reader 881 reads in the needed video frame information. The information is read into a First-In, First-Out (FIFO) data queue 892 of pixel data. In one embodiment, the FIFO data queue 892 stores a full video frame of information such that a next step of frame blending may be performed upon adjacent video frames as necessary. Specifically, there may be queues for both a current frame 891 and a next frame 892 such that the two frames may be blended. In one embodiment, a first FIFO queue stores luminance (Y) information and a second FIFO data queue stores chroma ($C_r$ and $C_b$) information. However, many different types of systems may be used to store video information such as YUV or RGB.

Next, in the embodiment of FIG. 8, a frame blending stage 885 blends frames together as appropriate to improve video quality. Note that this is an optional step that improves quality but is not required to render the final output. An example of frame blending is illustrated in FIG. 5 wherein the 3-2 pull-down frames at sixty frames per second displayed in the second row of frames have certain adjacent frames blended together as illustrated in the third row of frames to make the video appear smoother. Frame blending allows for inter-frame interpolation techniques to be used.

After frame blending, the embodiment of FIG. 8 then begins video frame resizing. Vertical and horizontal may be performed in one step in some embodiments. However, in the video processing pipeline 866 embodiment in FIG. 8, the frame resizing is split into individual vertical and horizontal stages. Dividing the task into vertical and horizontal resizing stages may simplify the implementation. In such a two-stage system, the specific order may not be important, but in the embodiment of FIG. 8, the vertical frame resizing is performed before the horizontal resizing.

To perform vertical resizing, the video is transformed from a native video resolution to a destination video window resolution. If the native video resolution and the destination video window resolution are equal, then no processing needs to be performed at this stage and the data simply passes through. However, when native video resolution and the destination video window resolution are not equal, then the chroma resample and vertical resize stage 832 will have to either expand or shrink the resolution of the video to fit into the destination video window. Various different interpolation systems may be used when expanding an image such as linear interpolation, bilinear interpolation, bicubic interpolation, or hqx (high quality magnification) interpolation. The chroma resample and vertical resize stage 832 receives video and target window size information from the resizing calculator 831 in order to determine the coefficients that will be needed for performing the vertical resizing.

Figure 9A:
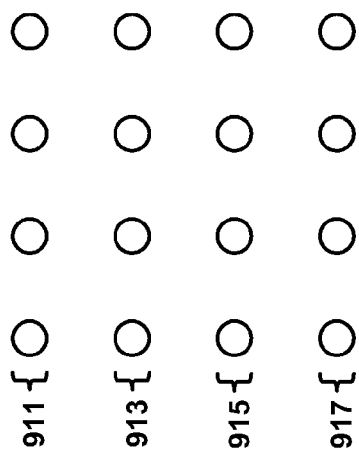
FIG. 9A conceptually illustrates a set of pixels from an original source video frame.
Figure 9C:
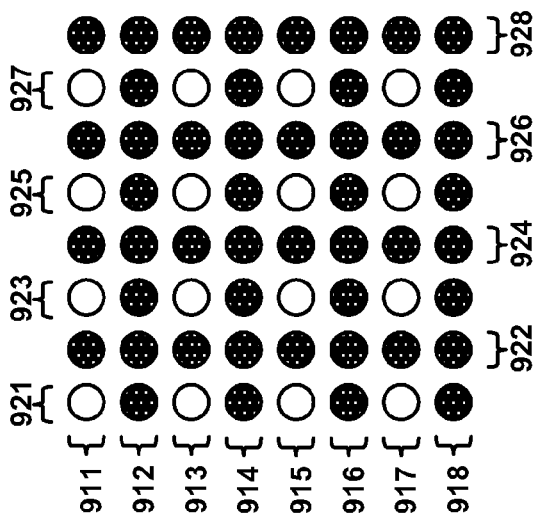
FIG. 9C conceptually illustrates the set of pixels from the video frame information of FIG. 9B after processing the pixels with a horizontal resizing system that has doubled the horizontal resolution.
Figure 9B:
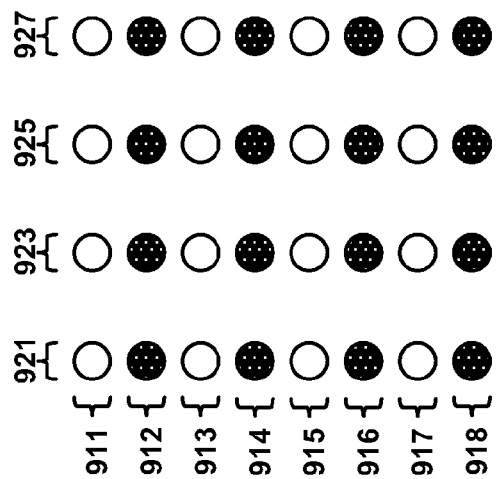
FIG. 9B conceptually illustrates the set of pixels from the original source video frame of FIG. 9A after processing the pixels with a vertical resizing system that has doubled the vertical resolution.

A simple example of vertical resizing is illustrated with reference to FIGS. 9A and 9B wherein an image is resized to twice its original vertical resolution. The chroma resample and vertical resize stage 832 handles the vertical resizing one row at a time starting from the top row. Thus, the chroma resample and vertical resize stage 832 would begin with row 911, then process row 913, and so on. Referring back to FIG. 8, the first row (911) may be loaded into the next row FIFO 894. That row may also be passed through to the next set of FIFO buffers as row 911 in FIG. 9B. That first row of pixels (911) is then moved from next row FIFO 894 to current row FIFO 893, and the next row of pixels (913) is loaded into the next row FIFO 894. (In an alternate embodiment, the initial row may be passed through from current row FIFO 893 to the next set of FIFO buffers.) With the first row of pixels (911) in current row FIFO 893 and the second row of pixels (913) in next row FIFO 894, the chroma resample and vertical resize stage 832 may output an interpolated row of pixels illustrated as pixel row 912 in FIG. 9B. The second row of pixels (913) is then moved from next row FIFO 894 to current row FIFO 893, and the next row of pixels (915) is loaded into the next row FIFO 894. The chroma resample and vertical resize stage 832 can then output a third row of pixels (913) from current row FIFO 893 and output a fourth row of pixels (914) by interpolating a row of pixels from current row FIFO 893 and next row FIFO 894. The chroma resample and vertical resize stage 832 will output an entire series of pixel rows in the final window resolution in this manner to the FIFO buffers between chroma resample and vertical resize stage 832 and chroma resample and horizontal resize stage 833.

In one particular embodiment, bilinear filters may be used for interpolation. Bilinear filters may be selected in order to minimize the silicon area needed for implementation and to minimize internal memory usage. A first bilinear filter is used for vertical resizing and chroma up-sampling stage to bring the video to a 4:2:2 format. Then a second bilinear filter is used for horizontal upsizing and chroma up-sampling to bring the video to a 4:4:4 format. The coefficients for the filters may be generated in the hardware. The coefficient generator takes into account the input and output sizes and generates the weights for the component pixels to form an interpolated pixel. By combining the coefficient generation for chroma up-sampling and upsizing, the same filter can be used for both the operations. Furthermore, the intermediate data does not need to be saved in external memory. This results in both low memory bandwidth and low silicon area requirements.

The chroma resample and horizontal resize stage 833 operates in a very similar manner to the chroma resample and vertical resize stage 832 except that an extra input row of pixels is no longer needed since all of the pixels are fed into the FIFO queue in the proper horizontal order. Thus, the chroma resample and horizontal resize stage 833 processes the pixels as they are read from the FIFO. (Note that the chroma resample and horizontal resize stage 833 does need to maintain a copy of the previous pixel for creating interpolated pixels.)

An example of the processing performed by the chroma resample and horizontal resize stage 833 can be illustrated with reference to FIGS. 9B and 9C. The pixels from the first row 911 of FIG. 9B will be encountered first. The chroma resample and horizontal resize stage 833 will output processed pixels as appropriate. In the example of doubling a frame width, the chroma resample and horizontal resize stage 833 will first output the first pixel in column 921 of row 911. The chroma resample and horizontal resize stage 833 will then output an interpolated pixel in column 922 of row 911. Next, the chroma resample and horizontal resize stage 833 will output another original pixel in column 923 of row 911. And so on until all the rows of the output have been horizontally resized. FIG. 9C illustrates an example output after doubling both the vertical and horizontal resolution of the original source pixel information illustrated in FIG. 9A. Note that the horizontal and vertical and chroma resample and resizing stages 833 and 832 can resize from any input resolution to any output resolution as necessary. The resizing calculator 831 and the horizontal and vertical and chroma resample and resizing stages 833 and 832 will determine when to add or subtract rows and columns as necessary and how to generate the rows and columns that will be output.

Subsequent to processing by the chroma resample and vertical resize stage 832 and the chroma resample and horizontal resize stage 833, processing of the pixels shifts to the color space conversion stage 871. The color space conversion stage 871 may receive color space information from the video decoder 862 in order to determine the specific color space conversion to perform. The color space conversion stage 871 uses the information to process each individual pixel to change it from a source color space to a final color space (generally RGB) needed for display. Note that by performing clipping either prior to video post processing or at the head of the video processing pipeline 866, and performing color space conversion at the very end of the video processing pipeline 866, the color space conversion stage 871 will not process any pixels from the video that were not on the display screen.

Color space conversion is well-known in the art. The following equations are used by many video systems for YCrCb to RGB conversion:

$$R = Y + 1.371(Cr - 128)$$

$$G = Y - 0.698(Cr - 128) - 0.336(Cb - 128)$$

$$B = Y + 1.732(Cb - 128)$$

When performing YCbCr to RGB conversion using the above equations, the resulting RGB values have a nominal range of 16 to 235. For a range of 0 to 255 for the 24-bit RGB data, as is commonly found in personal computers, the following equations may be used to maintain the correct black and white levels:

$$R = 1.164(Y - 16) + 1.596(Cr - 128)$$

$$G = 1.164(Y - 16) - 0.813(Cr - 128) - 0.392(Cb - 128)$$

$$B = 1.164(Y - 16) + 2.017(Cb - 128)$$

For the YCbCr to RGB equations, the RGB values must be saturated at the 0 and 255 levels if values are outside the nominal ranges.

The color space conversion stage 871 outputs the final pixel data into a pixel buffer 875. The pixel data within the pixel buffer 875 represent the video window pixels in a series of rows from top to bottom wherein each row is from left to right. The pixel buffer 875 is a FIFO that is deep enough to take advantage of the vertical and horizontal blanking periods. The data in the pixel buffer 875 is the output data from the video processing pipeline 866 that is then made available to the video display driver 865.

The video display driver 865 then integrates the display information from various sources. Most of the display information will generally be scanned in from the screen buffer 860. However, when the video display driver 865 encounters a location occupied by a video window (such as window 640 in FIG. 6B), the video display driver 865 will read information from the pixel buffer 875. The video display driver 865 may determine when it is within a video window by receiving video window information 851. When the video display driver 865 is in a video window and the pixel information from the screen buffer 860 is the particular coded hue associated with a video window, then the video display driver 865 will use the pixel data read from the pixel buffer 875. When a video window has been expanded to fill most of or the entire display, then most of the pixels in the screen buffer 860 will be of the special coded hue such that most (or possibly all) of the needed pixel data will by read out of the pixel buffer 875 by video display driver 865. In addition to the normal desktop display in screen buffer 860 and the video window information from pixel buffer 875, the video display driver 865 may also render additional video overlays 876 such as cursor pointers or closed captioning displays for videos.

Figure 10:
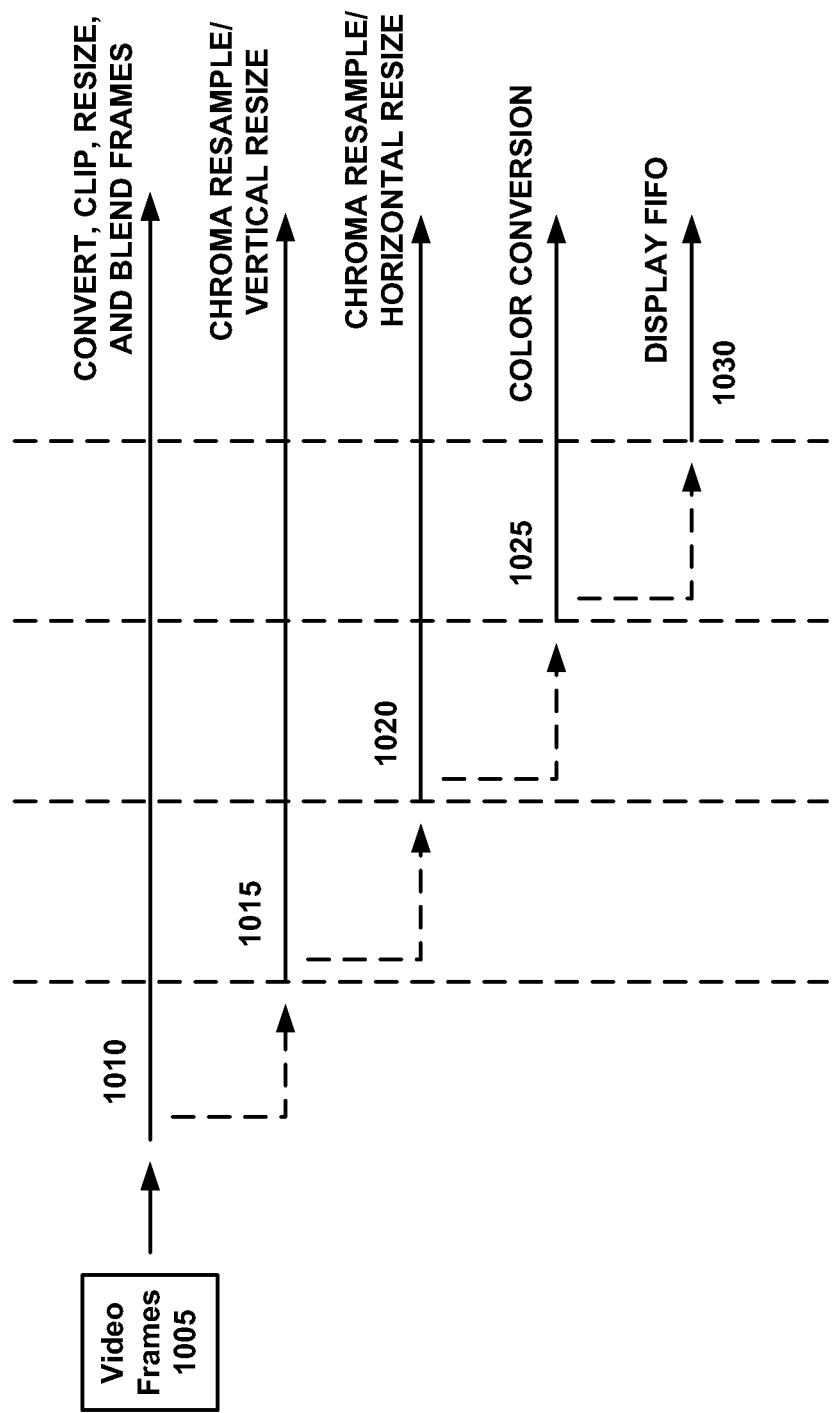
FIG. 10 illustrates a conceptual diagram of the video processing pipeline.

The entire video processing pipeline 866 may be implemented using a processing pipeline architecture wherein each pipeline processing stage operates in parallel with the other pipeline processing stages. FIG. 10 shows a conceptual diagram that illustrates the various pipeline processing stages 1010, 1015, 1020, 1025, 1030 operating in parallel. The conceptual diagram of FIG. 10 differs from the stages presented in FIG. 7 since frame clipping 791, if implemented as part of video post processing, and frame blending 792 are both performed in a single pipeline processing stage, such as stage 1010, and a display FIFO stage 1030 has been added to the pipeline processing stages at the end of FIG. 10. In FIG. 7, the display FIFO is illustrated as a video display driver 765 located external to the video processing pipeline 766.

As depicted in FIG. 8, the video processing pipeline 866 greatly reduces the memory bandwidth needed by the video buffer 868. In a conventional system, each step of frame blending, frame resizing, and color space conversion may have required both a read and write of pixel data from video buffer 868. However, with the video processing pipeline 866, the memory bandwidth of the memory uses for video buffer 868 does not need to be large since only the video decoder 862 writes video frames to the video buffer 868 and only the frame reader 881 reads video frames from the frame buffer at the rate of the display refresh rate. Thus, in many implementations, the video buffer 868 may be implemented with general purpose memory components. Furthermore, the memory system used for video buffer 868 is used by other parts of an integrated system.

By using the video processing pipeline 866 in FIG. 8 within the thin-client terminal system 240 of FIG. 4, the quality of the user experience for the user of thin-client terminal system 240 will be greatly improved. By transmitting full-motion video information to the thin-client terminal system 240 in an encoding format designed for encoding full-motion video, the amount of display information transmitted on the network will be lower than in the systems of FIGS. 2B and 3. Furthermore, the video processing pipeline 866 may implement advanced techniques such as video blending that actually improve the video quality over its native encoding by creating blended frames instead of simply repeating the same frame.

In addition to improving the user experience for a user that is watching full-motion video on a thin-client terminal system 240, the system disclosed in FIGS. 4, 7, and 8 also improves the user experience for all the other thin-client terminal system users that share the same thin-client server system 220. The other users will have an improved user experience since the thin-client server system 220 is effectively off-loading video decoding tasks to the thin-client terminal system 240. Since video decoding can be a processor and memory intensive task, the thin-client server system 220 will be able to operate faster when that task is performed by the thin-client terminal systems 240.

The video processing pipeline 866 greatly reduces the memory bandwidth required to implement the system. The following tables provide the calculations that compare a normal system with the video processing pipeline 866 of the present disclosure. The comparisons presented hereafter assume a simple frame rate conversion scenario where video data is directly displayed and not written back to a frame buffer.

TABLE 1

Definitions

| NAME | DEFINITION | EXAMPLE VALUE |
|---|---|---|
| Vi | Vertical resolution of input decoded stream | 720 |
| Hi | Horizontal resolution of input decoded stream | 480 |
| Bi | Bytes per pixel of input decoded stream, e.g., 1.5 for 4:2:0 | 1.5 |
| Ri | Frame Rate for input decoded stream | 30 |
| Vo | Vertical resolution of the output resized picture | 1920 |
| Ho | Horizontal resolution of the resized picture | 1080 |
| Bo | Bytes per pixel of the chroma upsampled picture, e.g., 3 bytes for 4:4:4 | 3 |
| Ro | Refresh rate of the monitor | 60 |
| $B_{420}$ | Input 4:2:0 CrCb bytes per pixel to be chroma upsampled | 0.5 |
| $B_{422}$ | CrCb bytes per pixel after chroma upsampling to 4:2:2 | 1 |
| $B_{444}$ | CrCb bytes per pixel after chroma upsampling to 4:4:4 | 2 |

TABLE 2

Unoptimized Memory Bandwidth Calculations
UNOPTIMIZED MEMORY BANDWIDTH CALCULATIONS

| OPERATION | NUMBER OF PIXELS | BYTES PER PIXEL | FRAME RATE | DATA TRANSFER FOR THE OPERATION |
|---|---|---|---|---|
| READ FROM MEM FOR CHROMA UP SAMPLE TO 4:2:2 | Vi * Hi | $B_{420}$ = 0.5 | Ri | Vi * Hi * Ri * 0.5 |
| WRITE BACK THE CHROMA UP SAMPLE (4:2:2) | Vi * Hi | $B_{422}$ = 1 | Ri | Vi * Hi * Ri |
| READ FROM MEM FOR CHROMA UP SAMPLE TO 4:4:4 | Vi * Hi | $B_{422}$ = 1 | Ri | Vi * Hi * Ri |
| WRITE BACK THE CHROMA UP SAMPLE (4:4:4)) | Vi * Hi | $B_{444}$ = 2 | Ri | Vi * Hi * Ri * 2 |
| READ FOR RESIZE | Vi * Hi | Bo = 3 | Ri | Vi * Hi * Ri * 3 |
| WRITE BACK RESIZED AND COLOR CONVERTED DATA | Vo * Ho | Bo = 3 | Ri | Vo * Ho * Ri * 3 |
| READ FOR FRAME CONVERT AND | Vo * Ho | Bo = 3 | Ro | Vo * Ho * Ro * 3 |

TABLE 2-continued

Unoptimized Memory Bandwidth Calculations
UNOPTIMIZED MEMORY BANDWIDTH CALCULATIONS

| OPERATION | NUMBER OF PIXELS | BYTES PER PIXEL | FRAME RATE | DATA TRANSFER FOR THE OPERATION |
|---|---|---|---|---|
| DISPLAY | | | | |
| TOTAL | | | | 7.5 * (Vi * Hi * Ri) + 3 * (Vo * Ho * (Ri + Ro)) |

TABLE 3

MEMORY BANDWIDTH FOR OPTIMIZED DATA FLOW
MEMORY BANDWIDTH FOR OPTIMIZED DATA FLOW

| OPERATION | NUMBER OF PIXELS | BYTES PER PIXEL | FRAME RATE | DATA TRANSFER FOR THE OPERATION |
|---|---|---|---|---|
| READ FROM MEM FOR CHROMA UP SAMPLE, FRAME RATE CONVERSION, RESIZE AND DISPLAY | Vi * Hi | Bi = 1.5 | Ro | Vi * Hi * Ro * 1.5 |
| TOTAL | | | | Vi * Hi * Ro * 1.5 |

Total Memory BW in the un-optimized case: 637 MB/s
Total Memory BW in the collapsed case: 31 MB/s Thus, as shown above, the video processing pipeline greatly reduces the memory bandwidth required to process a video stream compared to a conventional system, such as the embodiment of FIG. 2B.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of processing video information, the method comprising:
    decoding a stream of digitally encoded video into video frames stored in a first memory;
    reading a series of video frames from the first memory into a video processing pipeline for generating video output for a destination video window including reading luminance information of the series of video frames into a first queue of the video processing pipeline and reading chrominance information of the series of video frames into a second queue of the video processing pipeline;
    simultaneously resizing and chroma upsampling the video frames from a native video resolution to a target resolution for the destination video window including resizing the luminance information of the first queue and resizing and chroma upsampling the chrominance information of the second queue;
    performing color space conversion on each pixel in the resized and chroma upsampled video frames; and
    outputting a series of pixel data bits representing an output series of video frames of the digitally encoded video for display in the destination video window,
        wherein the simultaneous resizing and chroma upsampling, performing, and outputting are performed without accessing a memory external to the video processing pipeline.

2. The method of claim 1, wherein the reading a series of video frames from the first memory comprises reading only portions of the video frames that are visible in the destination video window.

3. The method of claim 1, further comprising performing frame rate conversion by reading in the video frames stored in the first memory at a rate corresponding to a refresh rate of a display device.

4. The method of claim 1, further comprising blending a subset of the series of video frames read in from the first memory to create intermediate video frames.

5. The method of claim 1, wherein the simultaneous resizing and chroma upsampling the video frames is performed in a vertical resizing and chroma upsampling stage and a horizontal resizing and chroma upsampling stage.

6. The method of claim 1, further comprising combining the series of pixel data bits representing the series of frames of the digitally encoded video in the destination video window with pixel data from a screen buffer.

7. The method of claim 1, further comprising buffering pixel data from the video frames in the first queue and the second queue between the simultaneous resizing and chroma upsampling and the performing color space conversion.

8. The method of claim 6, wherein the outputting a series of pixel data bits outputs the series of pixel data bits representing the series of frames of the digitally encoded video if pixel data in a screen buffer corresponds to a first key color, and wherein the outputting a series of pixel data bits outputs the pixel data stored in the screen buffer if the pixel data in the screen buffer does not correspond to the first key color.

9. The method of claim 1, wherein the simultaneous resizing and chroma upsampling of the video frames is a based on an interpolation of pixels in adjacent rows and columns of pixels in the video frames.

10. The method of claim 9, wherein the interpolation is performed by combining coefficients associated with the simultaneous resizing and chroma upsampling, the simultaneous resizing and chroma upsampling being based on a particular filtering operation.

11. A system for processing video information, the system comprising:
   a first memory configured to store video frames from a stream of digitally encoded video; and
   a video processing pipeline, comprising:
      a frame reader configured to read a series of video frames from the first memory into First-In First-Out (FIFO) queues including reading luminance information into a first FIFO queue and reading chrominance information into a second FIFO queue;
      a simultaneous resizing and chroma upsampling stage configured to simultaneously resize and chroma upsample video frames from a native video resolution to a target resolution for a destination video window, the simultaneous resizing and chroma upsampling stage further configured to resize the luminance information of the first FIFO queue and to resize and chroma upsample the chrominance information of the second FIFO queue without accessing an external memory being external to the video processing pipeline;
      a color space conversion stage configured to perform color space conversion on each pixel in the resized and chroma upsampled video frames without accessing the external memory; and
      an output queue configured to output a series of pixel data bits representing an output series of video frames of the digitally encoded video in the destination video window without accessing the external memory.

12. The system of claim 11, further comprising a frame rate converter configured to determine a frame rate of the stored video frames and to convert the frame rate of the stored video frames to a refresh rate of a display device.

13. The system of claim 11, further comprising a clipping and address calculator configured to determine a subset of video frame information for the frame reader to read from the first memory corresponding to visible portions of the video frame displayed in the destination video window.

14. The system of claim 11, further comprising a frame blending stage configured to blend a subset of the series of video frames read in from the first memory.

15. The system of claim 11, wherein the simultaneous resizing and chroma upsampling stage is divided into a vertical resizing and chroma upsampling stage and a horizontal resizing and chroma upsampling stage.

16. The system of claim 11, further comprising a video display driver configured to combine the series of pixel data bits representing the series of frames of the digitally encoded video with pixel data from a screen buffer in an output video signal to be output to a display device.

17. The system of claim 11, wherein the first memory, the frame reader, the simultaneous resizing and chroma upsampling stage, the color space conversion stage, and the output queue are located in a terminal device that receives the stream of digitally encoded video from a server in communication with the terminal device.

18. The system of claim 14, further comprising:
   a current frame First-In First-Out (FIFO) queue configured to feed the frame blending stage; and
   a next frame First-In First-Out queue configured to feed the frame blending stage.

19. The system of claim 16, wherein the video display driver is configured to select the series of pixel data bits representing the series of frames of the digitally encoded video to be output if pixel data in a screen buffer corresponds to a first key color, and wherein the video display driver is configured to select the pixel data stored in the screen buffer to be output if the pixel data in the screen buffer does not correspond to the first key color.

20. A digital video system for rendering a video signal, the digital video system comprising:
   a screen buffer configured to store a digital representation of a computer display having at least one application window, one of the application windows comprising a full-motion video window;
   a video decoder configured to decode a digital video stream into video frames stored in a video buffer;
   a video processing pipeline configured to, without accessing an external memory external to the video processing pipeline:
      read the video frames from the video buffer including reading luminance information of the video frames into a first queue of the video processing pipeline and reading chrominance information of the video frames into a second queue of the video processing pipeline;
      simultaneously resize and chroma upsample the video frames from a native video resolution to a target resolution for the full-motion video window including resizing the luminance information and resizing and chroma upsampling the chrominance information; and
      output a series of pixel bits for display in the full-motion video window; and
   a video display driver configured to combine the digital representation of the computer display with the series of pixel data bits in an output video signal.

21. The digital video system of claim 20, further comprising a video overlay system configured to provide additional video information for the video display driver to combine with the digital representation of the computer display and the series of pixel data bits.

22. The digital video system of claim 20, wherein the video processing pipeline is configured to read a subset of the video frames corresponding to visible portions of the video frames displayed in a display device.

23. The digital video system of claim 20, wherein the video processing pipeline is configured to perform frame blending.

24. The digital video system of claim 20, wherein the simultaneous resizing and chroma upsampling is performed in a vertical resizing and chroma upsampling stage and a horizontal resizing and chroma upsampling stage.

25. The digital video system of claim 20, wherein the video processing pipeline is configured to perform color space conversion.

26. The digital video system of claim 20, wherein the video display driver is configured to select the series of pixel data bits to be included in the output video signal if pixel data in the screen buffer corresponds to a first key color, and wherein the video display driver is configured to select the pixel data stored in the screen buffer to be included in the output video signal if the pixel data in the screen buffer does not correspond to the first key color.

27. The digital video system of claim 20, wherein the screen buffer, the video decoder, the video processing pipeline, and the video display driver are located in a first computing device that receives the digital video stream from a second computing device in communication with the first computing device.

28. A method of rendering a display on a terminal device, the method being performed by a computing device, the method comprising:
　maintaining a screen buffer in the terminal device, the screen buffer comprising a digital representation of a computer display having at least one application window, one of the application windows comprising a full-motion video window;
　receiving a digital video stream in the terminal device;
　decoding the digital video stream into video frames stored in a video buffer;
　reading the video frames into a video processing pipeline including reading luminance information of the video frames into a first queue of the video processing pipeline and reading chrominance information of the video frames into a second queue of the video processing pipeline;
　simultaneously resizing and chroma upsampling the video frames from a native video resolution to a target resolution for the full-motion video window including resizing the luminance information and resizing and chroma upsampling the chrominance information;
　outputting a series of pixel data bits from the video processing pipeline for display in the full-motion video window; and
　combining the digital representation of the computer display with the series of pixel data bits in an output video signal;
　wherein the simultaneously resizing and chroma upsampling and outputting are performed without accessing a memory external to the video processing pipeline.

29. The method of claim 28, further comprising combining video overlays with the digital representation of the computer display and the series of pixel data bits in the output video signal.

30. The method of claim 28, wherein the reading the video frames into the video processing pipeline comprises reading only a subset of the video frames corresponding to visible portions of the video frames displayed in a display device.

31. The method of claim 28, further comprising blending a subset of the video frames in the video processing pipeline to create intermediate video frames.

32. The method of claim 28, wherein the simultaneous resizing and chroma upsampling the video frames comprises vertically resizing and chroma upsampling the video frames in a first stage and horizontally resizing and chroma upsampling the video frames in a second stage.

33. The method of claim 28, further comprising performing color space conversation of the video frames in the video processing pipeline.

34. The method of claim 28, further comprising converting a frame rate of the video frames to equal a refresh rate of a display device when reading the video frames into the video processing pipeline.

35. The method of claim 28, wherein the combining comprises:
　selecting the series of pixel data bits to be included in the output video signal if pixel data in the screen buffer corresponds to a first hue; and
　selecting the pixel data stored in the screen buffer to be included in the output video signal if the pixel data in the screen buffer does not correspond to the first hue.

* * * * *